(12) United States Patent
Gal et al.

(10) Patent No.: US 10,592,992 B1
(45) Date of Patent: Mar. 17, 2020

(54) SYSTEM, METHOD, AND COMPUTER PROGRAM FOR CALCULATING NETWORK VALUE INFORMATION

(71) Applicant: Amdocs Software Systems Limited, Dublin (IE)

(72) Inventors: Eitan Gal, Tel-Aviv (IL); Gal Cohen, Hod-Hasharon (IL); Nir Pedhazur, Petah Tikva (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 990 days.

(21) Appl. No.: 14/942,874

(22) Filed: Nov. 16, 2015

(51) Int. Cl.
*G06Q 40/00* (2012.01)
*H04L 12/14* (2006.01)
*H04L 12/24* (2006.01)
*G06Q 50/00* (2012.01)

(52) U.S. Cl.
CPC .............. *G06Q 40/12* (2013.12); *G06Q 40/10* (2013.01); *G06Q 40/123* (2013.12); *G06Q 50/00* (2013.01); *H04L 12/1432* (2013.01); *H04L 41/142* (2013.01)

(58) Field of Classification Search
CPC ...... G06Q 40/10; G06Q 40/12; G06Q 40/123; G06Q 50/00
USPC .......................................... 705/30, 34, 412
See application file for complete search history.

(56) References Cited

U.S. PATENT DOCUMENTS

| 7,529,557 | B2 | 5/2009 | Farrill |
| 8,634,407 | B2 | 1/2014 | Mohammed et al. |
| 9,762,504 | B1* | 9/2017 | Foottit ............... H04L 47/70 |
| 2002/0173291 | A1 | 11/2002 | Hutcheson et al. |

(Continued)

*Primary Examiner* — Florian M Zeender
*Assistant Examiner* — Christopher R Buchanan
(74) *Attorney, Agent, or Firm* — Zilka-Kotab, PC (57) ABSTRACT

A system, method, and computer program product are provided for calculating network component value information. In use, network user information is received that is related to a plurality of network users in connection with at least one network. Such plurality of network users are organized into segments of network users, based on the network user information. Further, network usage charge information is identified that is related to charges for network usage over a predetermined amount of time, for at least one of the segments of network users. Also identified is network usage information related to network usage over the predetermined amount of time, for the at least one segment of network users. Based on this information, revenue rate information is calculated. Still yet, network component usage information is identified that is related to at least one of a plurality of network components of the at least one network utilized in connection with the network usage over the predetermined amount of time, for the at least one segment of network users. To this end, network component value information is calculated that is associated with the at least one network component of the at least one network utilized in connection with the network usage over the predetermined amount of time. Further, such network component value information calculation is based on the revenue rate information and the network component usage information, for output purposes.

9 Claims, 6 Drawing Sheets

(56) References Cited

U.S. PATENT DOCUMENTS

| | | | |
|---|---|---|---|
| 2007/0016666 A1* | 1/2007 | Duffield | H04L 12/14 709/223 |
| 2012/0096513 A1* | 4/2012 | Raleigh | H04L 12/1403 726/1 |
| 2014/0058908 A1* | 2/2014 | Gupta | G06Q 30/04 705/30 |
| 2015/0264189 A1 | 9/2015 | Morgan et al. | |
| 2016/0210578 A1* | 7/2016 | Raleigh | G06Q 10/06375 |

\* cited by examiner

SYSTEM, METHOD, AND COMPUTER PROGRAM FOR CALCULATING NETWORK VALUE INFORMATION

FIELD OF THE INVENTION

The present invention relates to networks, and more particularly to managing networks.

BACKGROUND

Network usage is one of the most important services a network operator provides to its customers. With that said, there is currently no direct relation between revenue generated from the network users to a particular network component (e.g. cell site) that attributed to such service. Complicated pricing schemes are common in the industry for both pre- and post-paid subscribers. Unfortunately, such pricing schemes obfuscate any direct relation between an individual use of the network and the revenue derived from the relevant network components. To this end, it is very difficult to attribute revenue allocations to such relevant network components, for the purposes of prioritizing maintenance, further investment of time and/or resources, etc.

There is thus a need for addressing these and/or other issues associated with the prior art.

SUMMARY

A system, method, and computer program product are provided for calculating network component value information. In use, network user information is received that is related to a plurality of network users in connection with at least one network. Such plurality of network users are organized into segments of network users, based on the network user information. Further, network usage charge information is identified that is related to charges for network usage over a predetermined amount of time, for at least one of the segments of network users. Also identified is network usage information related to network usage over the predetermined amount of time, for the at least one segment of network users. Based on this information, revenue rate information is calculated. Still yet, network component usage information is identified that is related to at least one of a plurality of network components of the at least one network utilized in connection with the network usage over the predetermined amount of time, for the at least one segment of network users. To this end, network component value information is calculated that is associated with the at least one network component of the at least one network utilized in connection with the network usage over the predetermined amount of time. Further, such network component value information calculation is based on the revenue rate information and the network component usage information, for output purposes.

DETAILED DESCRIPTION

Figure 1:
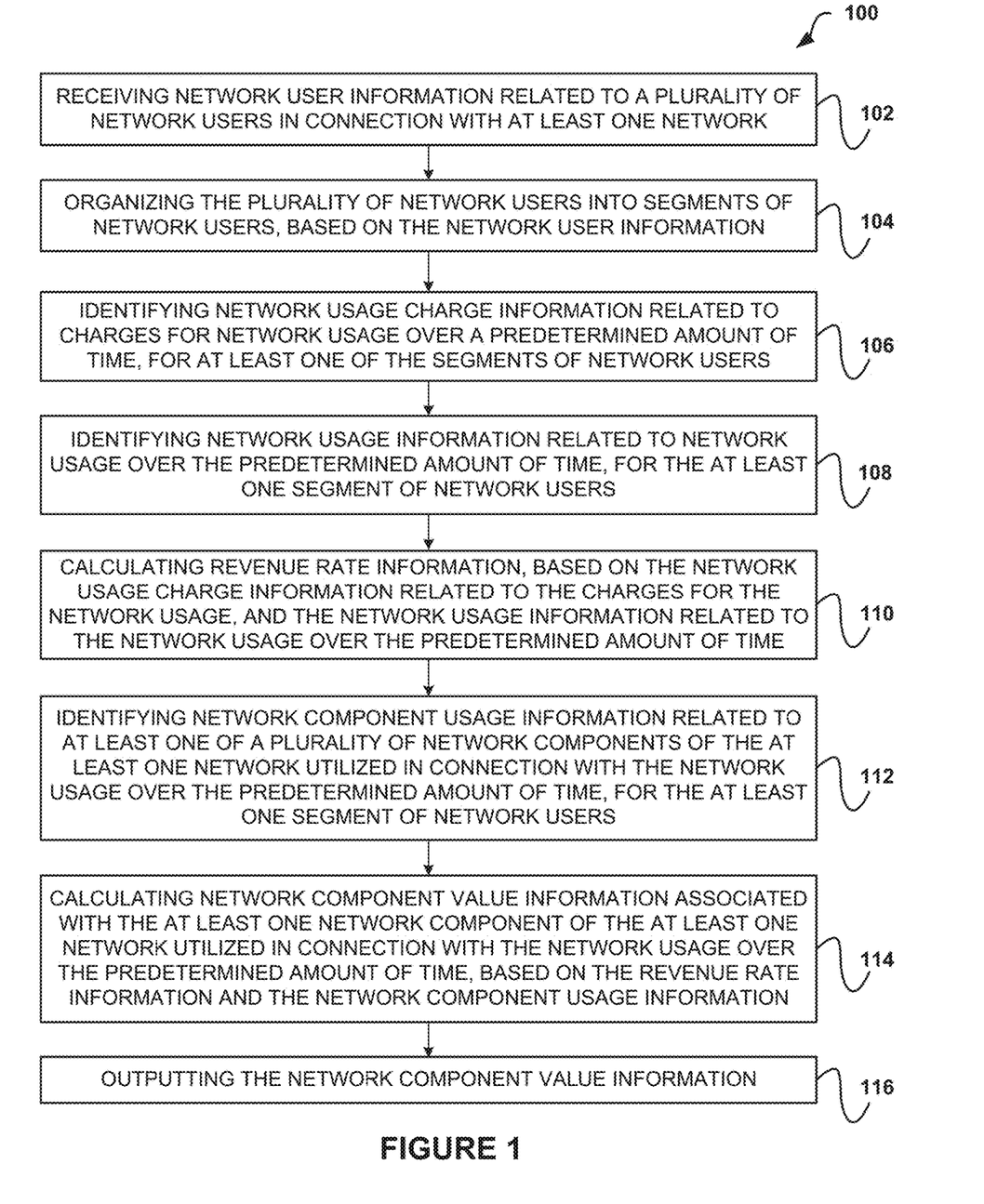
FIG. 1 illustrates a method for calculating network component value information, in accordance with one embodiment.

FIG. 1 illustrates a method 100 for calculating network component value information, in accordance with one embodiment. As shown, the method 100 includes receiving network user information related to a plurality of network users in connection with at least one network. See operation 102. In the context of the present description, the network user information may include any information related to the network users that is capable of being used to organize the same into segments of network users. Further, the at least one network may include one or more wireless networks (e.g. 802.11, cellular, LTE, LTE-Advanced, etc.), optical networks, hardwire networks, and/or any network, for that matter (or combination thereof).

To this end, the plurality of network users are organized into segments of network users, based on the network user information. See operation 104. Such organization and segments may refer to any grouping and groups, respectively, that is/are capable of being used to segment the identification and/or calculation of various information (that will be set forth in greater detail below).

As indicated in operation 106, network usage charge information is identified that is related to charges for network usage over a predetermined amount of time, for at least one of the segments of network users. In the context of the present description, the network usage charge information may include any information that includes or is derived from, at least in part, charges for network usage. Further, the predetermined amount of time may include any automatically and/or manually determined amount of time (e.g. day, week, month, quarterly, year, random, etc.). Still yet, the foregoing information (and/or another information disclosed herein) may be identified in any desired manner. For example, it may be received, looked-up, calculated, determined, inferred, and/or ascertained utilizing any other technique resulting in the identification of the relevant information.

Moving to operation 108, network usage information is identified that is related to network usage over the predetermined amount of time, for the at least one segment of network users. In the context of the present description, the network usage information may include any information that includes or is derived from, at least in part, network usage.

Based on the network usage charge information and the network usage information, revenue rate information is calculated. See operation 110. Such revenue rate information, in the context of the present description, may include any information that is a function of both the network usage charge information and the network usage information.

In operation 112, network component usage information is identified that is related to at least one of a plurality of network components of the at least one network utilized in connection with the network usage over the predetermined amount of time, for the at least one segment of network users. In the context of the present description, such network components may include a cell site or portion thereof, base station or portion thereof, network segment, sub-network, and/or any other component (e.g. part, portion, etc.) of the at least one network. Still yet, the network component usage information may include any information that includes or is derived from, at least in part, a usage of the at least one network component.

By this design, network component value information is calculated which is associated with the at least one network component of the at least one network utilized in connection with the network usage. See operation 114. Such operation is further based on the aforementioned revenue rate information and the network component usage information, for output purposes. Note operation 116. In the present description, the network component value information includes or is derived from, at least in part, both the revenue rate information and the network component usage information, and represents a value derived from the corresponding network component.

As will become apparent during the description of this and subsequent embodiments, the aforementioned network component value information may or may not include actual revenue figure(s) in monetary form. Further, such network component value information may be used in any manual and/or automated manner to improve the at least one network and/or any service associated therewith.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
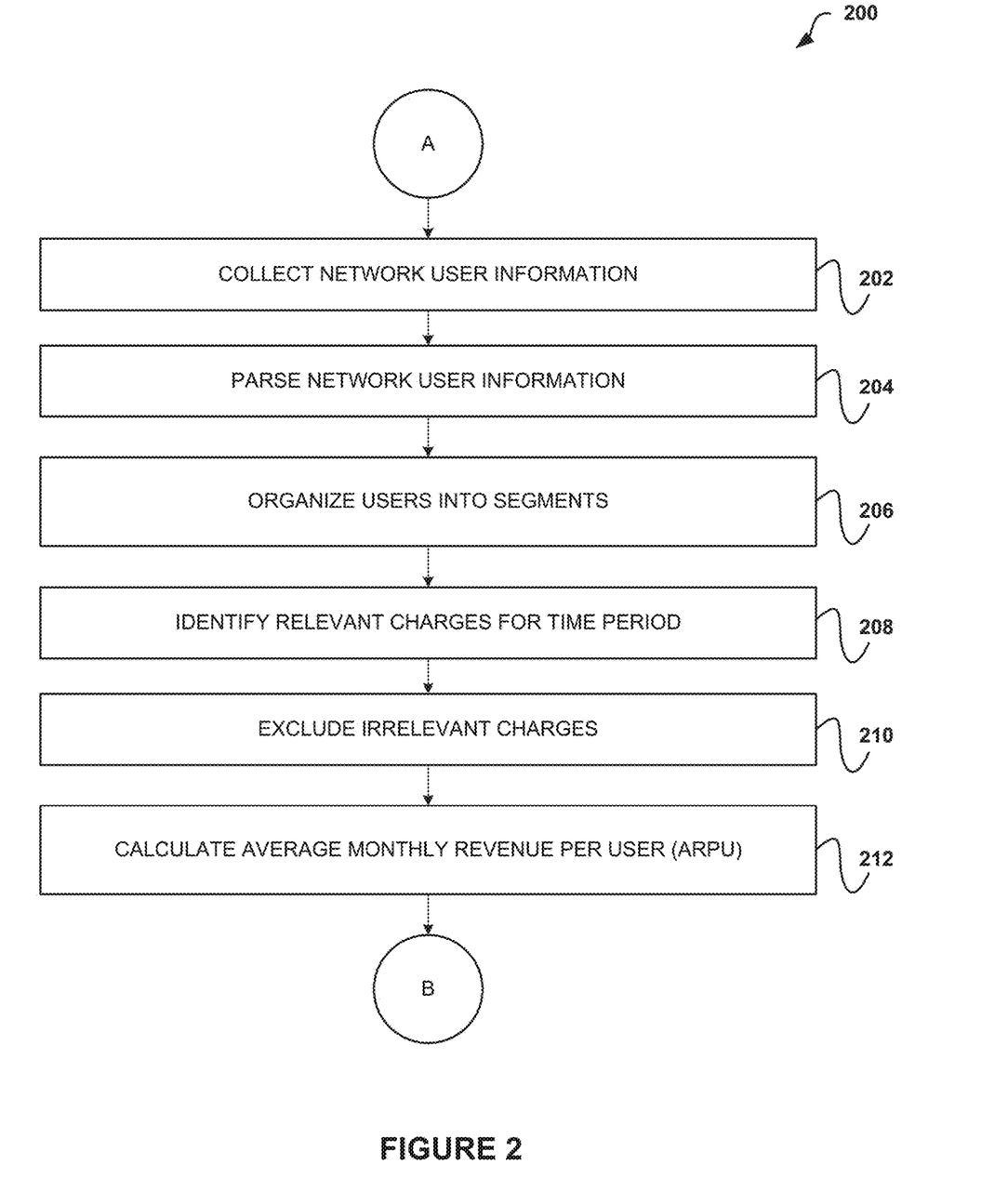
FIG. 2 illustrates a method for calculating network usage charge information, in accordance with one embodiment.

FIG. 2 illustrates a method 200 for calculating network usage charge information, in accordance with one embodiment. As an option, the method 200 may be implemented in the context of the details of FIG. 1 and/or any subsequent figure(s). Of course, however, the method 200 may be implemented in the context of any desired environment. Further, the aforementioned definitions may equally apply to the description below.

As shown, network user information is received that is related to a plurality of network users in connection with at least one network. See operation 202. For example, in one embodiment, the network user information may be received from a customer relationship management (CRM) database. Of course, the network user information may be received from any desired source, for that matter.

Next, in operation 204, the network user information may be parsed. In various embodiments, such parsing operation may be omitted, as desired. In the present embodiment, such parsing may involve identification of various fields of the network user information (e.g. records of the CRM database, etc.), for the purpose of making such fields available for organizing the network users.

As shown in operation 206, the plurality of network users are organized into segments of network users, based on the network user information. In one embodiment, the plurality of network users may be organized into the segments, based on network user type information of the network user information. Further, such network user type information may identify a class of each of the plurality of network users. Still yet, such class of each of the plurality of network users may include any one or more of a personal class, small business class, or large corporate class. Even still, other granularity may be incorporated into the organization of segments, based on very important person (VIP) status, etc.

Continuing with operation 208, network usage charge information is identified that is related to charges for network usage over a predetermined amount of time, for at least one of the segments of network users. In one embodiment, such network usage charge information may be limited, at least in part, to charge information relevant to the actual usage of the network. For instance, network usage-independent charge information may be excluded from the network usage charge information, prior to subsequent calculations to be elaborated upon later. See operation 210. Just by way of example, in various embodiments, such network usage-independent charge information that is excluded may include flat fees, late fees, charges from third parties (e.g. third party service providers), etc.

To this end, an average revenue per user may be calculated over the predetermined amount of time. See operation 212. In one embodiment, such figure may be an average monthly revenue per user (ARPU).

Figure 3:
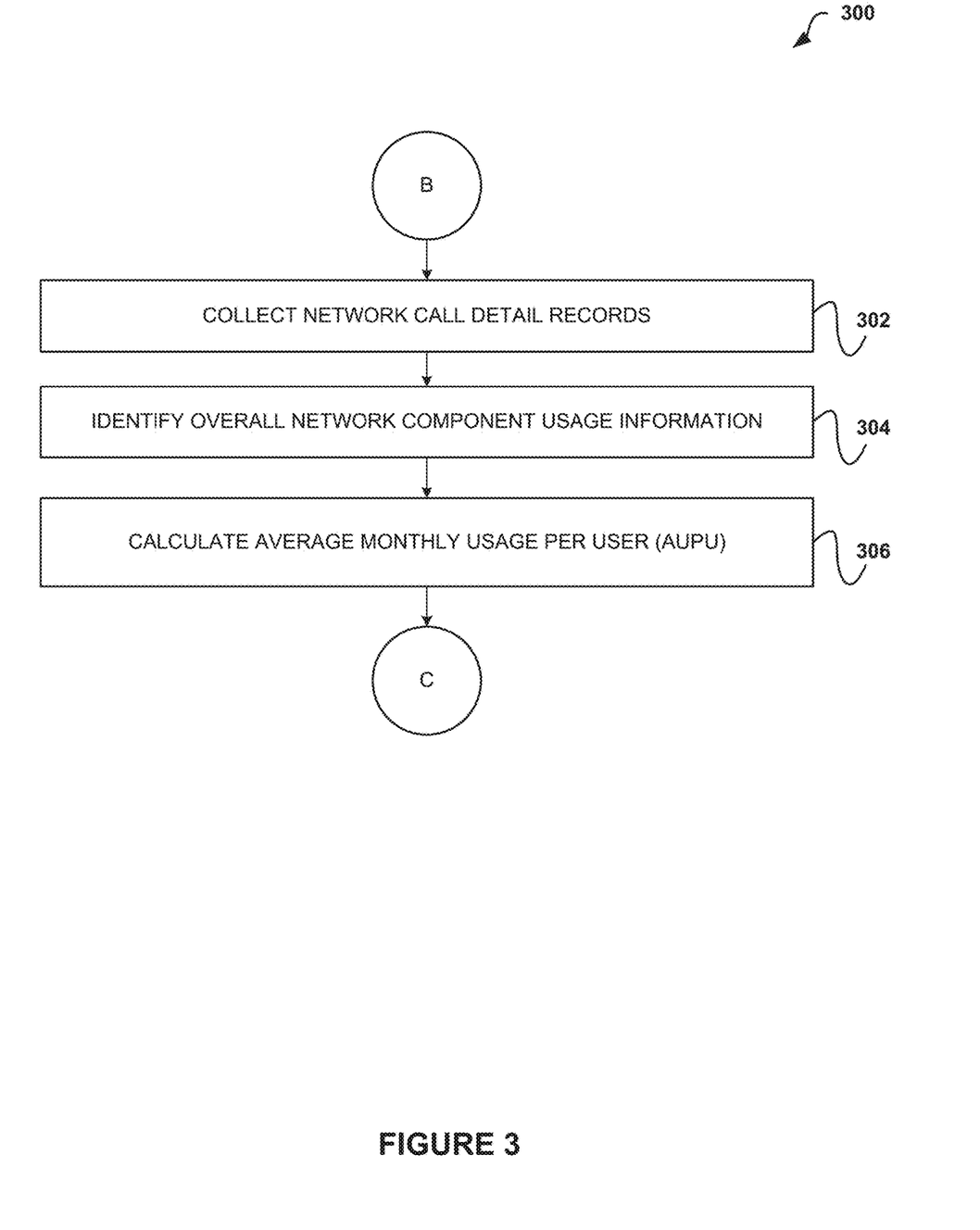
FIG. 3 illustrates a method for calculating network usage information, in accordance with one embodiment.

FIG. 3 illustrates a method 300 for calculating network usage information, in accordance with one embodiment. As an option, the method 300 may be implemented in the context of the details of any previous and/or subsequent figure(s). For example, the method 300 may be implemented after and in the context of the method 200 for calculating network usage charge information, as set forth in FIG. 2. Of course, however, the method 300 may be implemented in the context of any desired environment. Further, the aforementioned definitions may equally apply to the description below.

As indicated in operation 302, network call detail records are collected. Such network call detail records may then be parsed or otherwise processed for identifying network usage information related to network usage over a predetermined amount of time, for at least one of the segments of network users. See operation 304. In one embodiment, such network usage information may represent an overall usage of the at least one network (and any and all relevant components thereof) by the corresponding relevant network user segment. Further, such overall usage may correlate with an overall usage charge that was charged for such overall usage. To this end, the methods 200/300 of FIGS. 2/3 may be applied to the same network user segment, the same period of time, etc.

Thus, an average usage per user may be calculated. See operation 306. In one embodiment, an average monthly usage per user (AUPU) may be calculated, for use during subsequent calculations.

Figure 4:
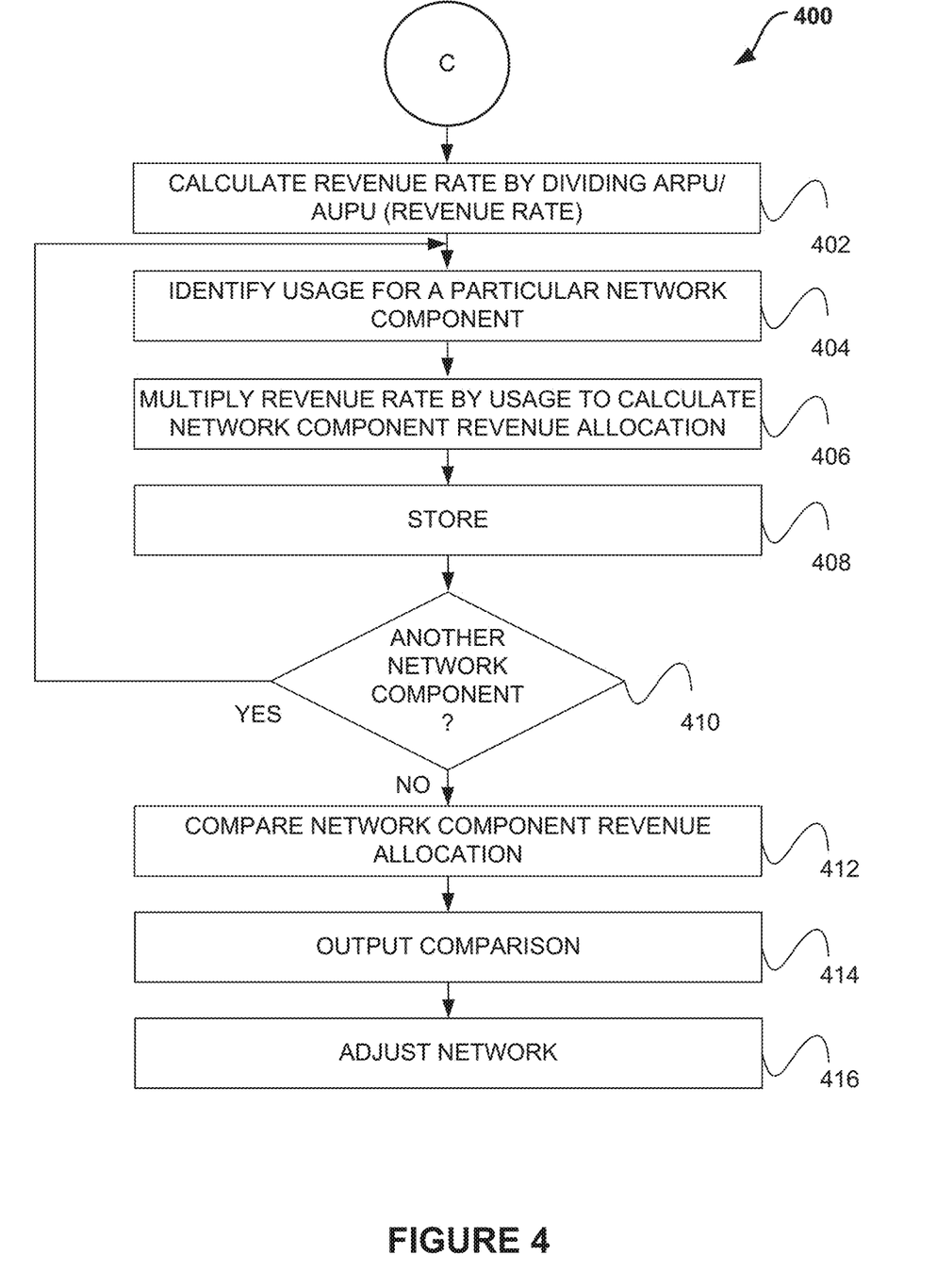
FIG. 4 illustrates a method for calculating network component value information, in accordance with one embodiment.

FIG. 4 illustrates a method 400 for calculating network component value information, in accordance with one embodiment. As an option, the method 400 may be implemented in the context of the details of any previous and/or subsequent figure(s). For example, the method 400 may be implemented after and in the context of the method 300 for calculating network usage information, as set forth in FIG. 3. Of course, however, the method 400 may be implemented in the context of any desired environment. Further, the aforementioned definitions may equally apply to the description below.

As indicated in operation 402, revenue rate information is calculated. Such revenue rate information calculation is based on the network usage charge information related to the charges for the network usage, and the network usage information related to the network usage, over the predetermined amount of time. In one embodiment, the revenue rate information may be calculated by dividing the network usage charge information by the network usage information (e.g. ARPU/AUPU).

Armed with such revenue rate information, the method 400 continues by iteratively repeating further processing for each of a plurality of network components. As shown in operation 404, network component usage information is then identified in operation 404, for a particular network component.

Such network component usage information is related to at least one of a plurality of network components of the at least one network utilized in connection with the network usage over the predetermined amount of time, for at least one of the segments of network users. In one embodiment, the network component usage information is generated based on the network usage information among the plurality of network components. For example, the network component usage information may be identified by allocating the network usage information among the plurality of network components. In such embodiment, such allocation may, for instance, be a function of a role of the network component in the respective network usage. Just by way of example, network usage may be allocated equally between transmitting and receiving sites (and/or any intermediate sites therebetween), in connection with a particular call/data session. Of course, embodiments are contemplated whereby any desired allocation algorithm (or no allocation at all) is utilized.

Next, in operation 406, network component value information is calculated, where such network component value information is associated with the at least one network component of the at least one network utilized in connection with the network usage over the predetermined amount of time. As mentioned during the description of previous embodiments, such network component value information may be calculated based on the revenue rate information and the network component usage information. In one possible embodiment, the network component value information may be calculated by multiplying the revenue rate information by the network component usage information, as indicated in FIG. 4. Of course, any calculation technique may be employed, as desired.

For example, in one embodiment, the network component value information may take on a non-monetary value. In such embodiment, a network component value (e.g. revenue allocation, etc.) may be calculated for each network component and then such revenue allocation may be divided by total revenue to generate a factor that may be used as the network component value information. It should be further noted that the period of time over which the network component value information may be calculated, may be the same, similar, or different from the period of time over which other calculations (e.g. ARPU, AUPU, etc.) were performed.

The network component value information (for the associated network component) is then stored in operation 408, for use in subsequent processing. The method 400 then continues by identifying another network component in decision 410. If another network component is available for network component value calculation, operation 404-408 are repeated.

When it is determined in decision 410 that no other network components require network component value calculation, the method 400 continues by comparing the network component value information. See operation 412. Such comparison may be carried out in any desired manner and for any purposes. For example, the plurality of network components may be prioritized based on the network component value information.

With continuing reference to FIG. 4, the comparison and/or any information derived therefrom may be output (e.g. displayed, transmitted to an output device or receiving device, etc.). See operation 414. To this end, any aspect of the at least one network may be adjusted based on the comparison. See operation 416. In one embodiment, the network component value information may be processed (e.g. combined, etc.) in connection with additional information (e.g. network component experience information, etc.) for generating an index for each of the plurality of network components which, in turn, may be used to compare the relative value of the network components.

For instance, resources may be allocated among the plurality of network components based on the network component value information. By this design, in some embodiments, investment in different network components (e.g. sites, etc.) may be prioritized based on the value thereof. Further, by starting with a segmentation of network users (vs. individual users), additional accuracy in network component value calculation may be afforded, in some embodiments, since exception usage patterns (associated with individual usage/charging) may be avoided.

Figure 5:
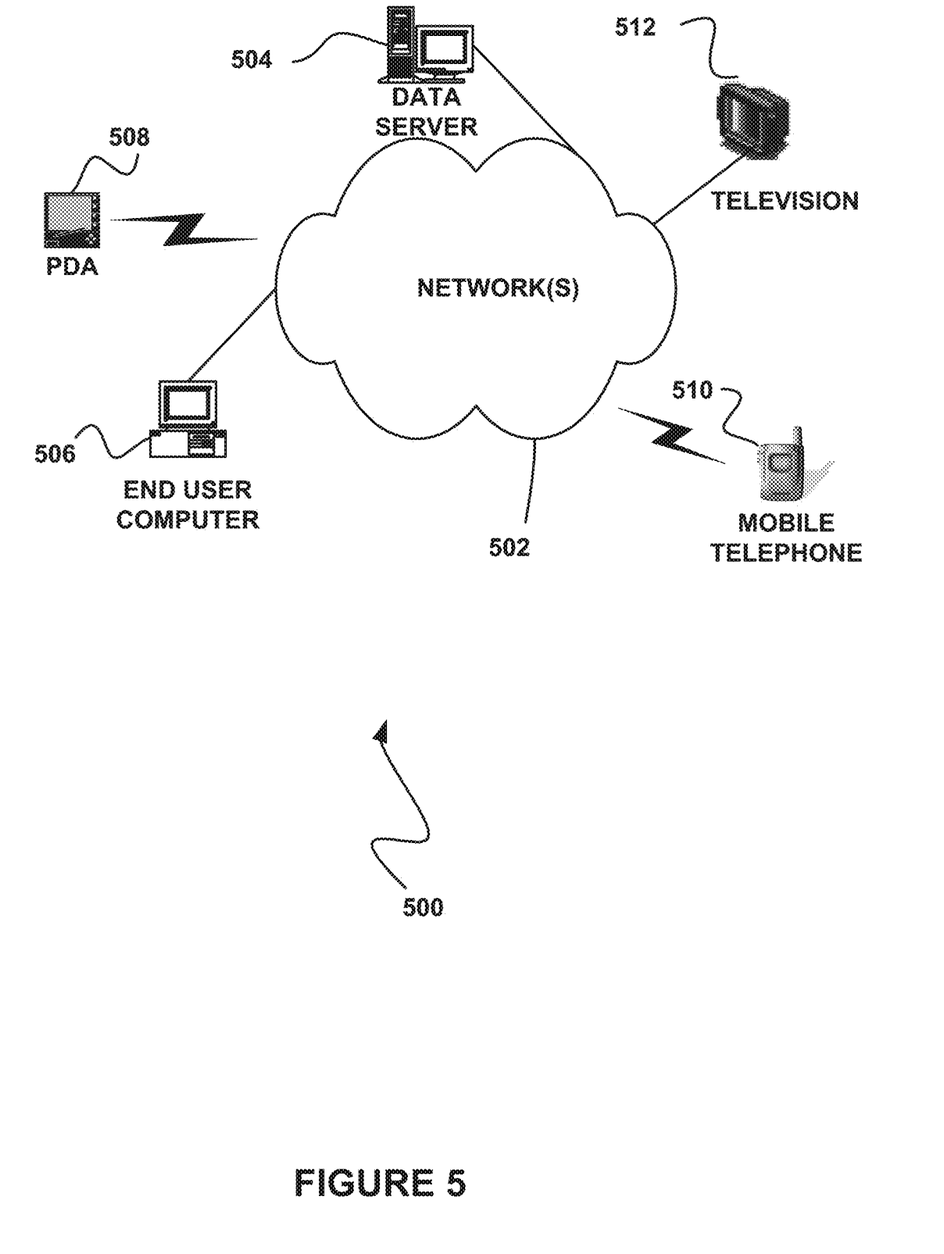
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
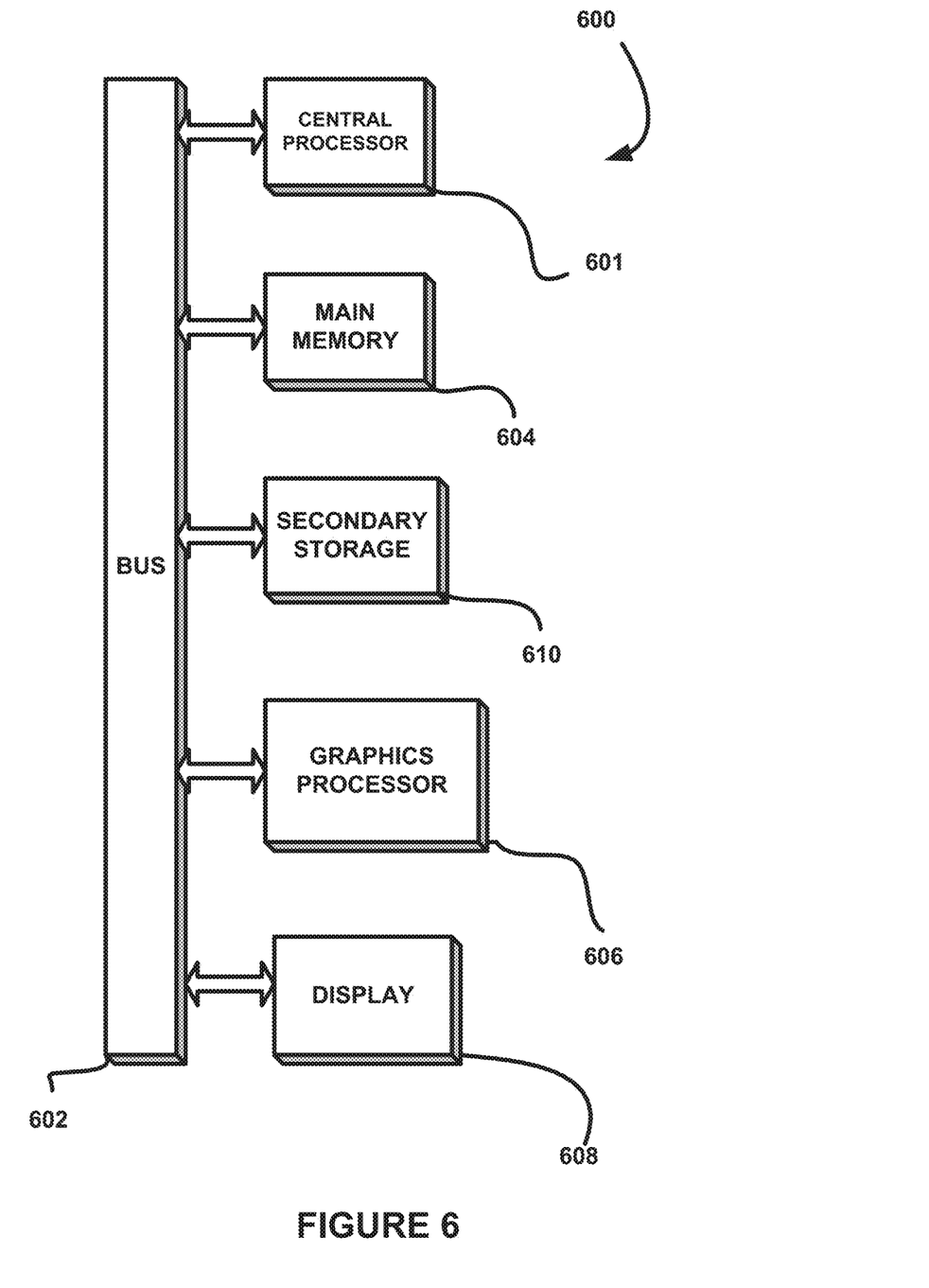
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:

receiving, by a computer system from a customer relationship management (CRM) database, a plurality of records each storing network user information for a corresponding network user of a network, the network user information categorizing the network user by network user type;

organizing, by the computer system, the plurality of network users into segments of network users, each segment corresponding to a different network user type;

selecting, by the computer system, at least one of the segments of network users;

looking up, by the computer system, network usage charge information indicating monetary charges to a portion of the network users included in the at least one of the segments of network users, the monetary charges being for actual network usage over a predetermined amount of time by the portion of the network users included in the at least one of the segments of network users;

collecting, by the computer system, network call detail records;

processing, by the computer system, the network call detail records to identify network usage information indicating network usage over the predetermined amount of time by the portion of the network users included in the at least one segment of network users;

calculating, by the computer system, revenue rate information, based on the network usage charge information and the network usage information, by dividing the network usage charge information by the network usage information;

apportioning, by the computer system, the network usage across a plurality of network hardware components of the network utilized in connection with the network usage over the predetermined amount of time by the portion of the network users included in the at least one segment of network users;

generating, by the computer system, network hardware component usage information for each network hardware component of the plurality of network hardware components, the network hardware component usage information indicating a portion of the network usage apportioned to the network hardware component;

for each network hardware component of the plurality of network hardware components:
  calculating, by the computer system, network hardware component value information representing a value derived from the network hardware component, the network hardware component value information generated by multiplying the revenue rate information and the network hardware component usage information generated for the network hardware component; and
  adjusting, by the computer system, at least one aspect of the network, based on the network hardware component value information calculated for each of the plurality of network hardware components, the adjusting including:
    selecting one or more network hardware components of the plurality of network hardware components to prioritize, based on the network hardware component value information calculated for each of the plurality of network hardware components, and
    allocating resources to the selected one or more network hardware components.

2. The computer program product of claim 1, wherein the computer program product is configured such that the network user type identifies a network user class.

3. The computer program product of claim 2, wherein the computer program product is configured such that the network user class includes at least one of a personal class, a small business class, or a large corporate class.

4. The computer program product of claim 1, wherein the computer program product is configured such that the network usage information indicates an average usage per user over the predetermined amount of time.

5. The computer program product of claim 1, wherein the computer program product is configured such that the predetermined amount of time includes at least one of a day, a week, a month, or a quarter.

6. The computer program product of claim 1, wherein the computer program product is configured such that the network hardware component value information is a non-monetary value.

7. The computer program product of claim 1, wherein the computer program product is configured for processing the network hardware component value information in connection with additional information for generating an index for each of the plurality of network hardware components.

8. A method, comprising:
receiving, by a computer system from a customer relationship management (CRM) database, a plurality of records each storing network user information for a corresponding network user of a network, the network user information categorizing the network user by network user type;

organizing, by the computer system, the plurality of network users into segments of network users, each segment corresponding to a different network user type;

selecting, by the computer system, at least one of the segments of network users;

looking up, by the computer system, network usage charge information indicating monetary charges to a portion of the network users included in the at least one of the segments of network users, the monetary charges being for actual network usage over a predetermined amount of time by the portion of the network users included in the at least one of the segments of network users;

collecting, by the computer system, network call detail records;

processing, by the computer system, the network call detail records to identify network usage information indicating network usage over the predetermined amount of time by the portion of the network users included in the at least one segment of network users;

calculating, by the computer system, revenue rate information, based on the network usage charge information and the network usage information, by dividing the network usage charge information by the network usage information;

apportioning, by the computer system, the network usage across a plurality of network hardware components of the network utilized in connection with the network usage over the predetermined amount of time by the portion of the network users included in the at least one segment of network users;

generating, by the computer system, network hardware component usage information for each network hardware component of the plurality of network hardware components, the network hardware component usage information indicating a portion of the network usage apportioned to the network hardware component;

for each network hardware component of the plurality of network hardware components:
  calculating, by the computer system, network hardware component value information representing a value derived from the network hardware component, the network hardware component value information generated by multiplying the revenue rate information and the network hardware component usage information generated for the network hardware component; and adjusting, by the computer system, at least one aspect of the network, based on the network hardware component value information calculated for each of the plurality of network hardware components, the adjusting including:

selecting one or more network hardware components of the plurality of network hardware components to prioritize, based on the network hardware component value information calculated for each of the plurality of network hardware components, and allocating resources to the selected one or more network hardware components.

9. A system, comprising:

one or more hardware processors for:

receiving, from a customer relationship management (CRM) database, a plurality of records each storing network user information for a corresponding network user of a network, the network user information categorizing the network user by network user type;

organizing the plurality of network users into segments of network users, each segment corresponding to a different network user type;

selecting at least one of the segments of network users;

looking up network usage charge information indicating monetary charges to a portion of the network users included in the at least one of the segments of network users, the monetary charges being for actual network usage over a predetermined amount of time by the portion of the network users included in the at least one of the segments of network users;

collecting network call detail records;

processing the network call detail records to identify network usage information indicating network usage over the predetermined amount of time by the portion of the network users included in the at least one segment of network users;

calculating revenue rate information, based on the network usage charge information and the network usage information, by dividing the network usage charge information by the network usage information;

apportioning the network usage across a plurality of network hardware components of the network utilized in connection with the network usage over the predetermined amount of time by the portion of the network users included in the at least one segment of network users;

generating network hardware component usage information for each network hardware component of the plurality of network hardware components, the network hardware component usage information indicating a portion of the network usage apportioned to the network hardware component;

for each network hardware component of the plurality of network hardware components:

calculating network hardware component value information representing a value derived from the network hardware component, the network hardware component value information generated by multiplying the revenue rate information and the network hardware component usage information generated for the network hardware component; and adjusting, by the computer system, at least one aspect of the network, based on the network hardware component value information calculated for each of the plurality of network hardware components, the adjusting including:

selecting one or more network hardware components of the plurality of network hardware components to prioritize, based on the network hardware component value information calculated for each of the plurality of network hardware components, and allocating resources to the selected one or more network hardware components.

* * * * *